(12) United States Patent
Sipilä et al.

(10) Patent No.: US 8,889,061 B2
(45) Date of Patent: Nov. 18, 2014

(54) ARRANGEMENT FOR EVENING OUT POWDERY SOLID MATTER FEED OF A CONCENTRATE BURNER OF A SUSPENSION SMELTING OR SUSPENSION CONVERTING FURNACE

(75) Inventors: Jussi Sipilä, Espoo (FI); Peter Björklund, Espoo (FI); Kaarle Peltoniemi, Espoo (FI); Lauri P. Pesonen, Helsinki (FI)

(73) Assignee: Outotec Oyj, Espoo (FI)

( * ) Notice: Subject to any disclaimer, the term of this patent is extended or adjusted under 35 U.S.C. 154(b) by 288 days.

(21) Appl. No.: 13/514,585

(22) PCT Filed: Dec. 10, 2010

(86) PCT No.: PCT/FI2010/051008
§ 371 (c)(1),
(2), (4) Date: Jun. 7, 2012

(87) PCT Pub. No.: WO2011/070239
PCT Pub. Date: Jun. 16, 2011

(65) Prior Publication Data
US 2012/0248664 A1  Oct. 4, 2012

(30) Foreign Application Priority Data

Dec. 11, 2009 (FI) ....................................... 20096313

(51) Int. Cl.
*F27D 3/00* (2006.01)
*F27D 3/18* (2006.01)

(52) U.S. Cl.
CPC ..................................... *F27D 3/18* (2013.01)
USPC .............................. 266/266; 266/265; 266/47

(58) Field of Classification Search
CPC ....................................................... F27D 3/18
USPC ............................ 266/176, 182, 265, 266, 47
See application file for complete search history.

(56) References Cited

U.S. PATENT DOCUMENTS

| | | | |
|---|---|---|---|
| 4,392,885 A | 7/1983 | Lilja | |
| 4,930,430 A | 6/1990 | Allen | |
| 6,238,457 B1 | 5/2001 | Holmi | |
| 6,565,799 B1 | 5/2003 | Kojo | |
| 2010/0267741 A1 | 10/2010 | Penrose | |
| 2012/0200012 A1* | 8/2012 | Sipila et al. | 266/44 |
| 2012/0228811 A1* | 9/2012 | Sipila | 266/44 |
| 2012/0248664 A1* | 10/2012 | Sipila et al. | 266/171 |

OTHER PUBLICATIONS

Marko Keranen, International Search Report for PCT/FI2010/051008, Mar. 23, 2011.

* cited by examiner

*Primary Examiner* — Scott Kastler
(74) *Attorney, Agent, or Firm* — Chernoff, Vilhauer, McClung & Stenzel, LLP

(57) ABSTRACT

A concentrate burner of a suspension smelting or suspension converting furnace includes a reaction gas feed, a powdery solid matter feed and a concentrate distributor. An arrangement for feeding powdery solid matter to the concentrate burner includes a first powdery solid matter discharge pipe for feeding powdery solid matter into the powdery solid matter feed of the concentrate burner. The first powdery solid matter discharge pipe is provided with a first partition, which divides solid matter, for dividing the first powdery solid matter discharge pipe into two essentially similar discharge pipe parts. The powdery solid matter feed of the concentrate burner comprise an annular concentrate discharge channel that surrounds the concentrate distributor of the concentrate burner. Each discharge pipe part of the first powdery solid matter discharge pipe is at least partly divided into two discharge pipe portions by a second partition.

22 Claims, 5 Drawing Sheets

US 8,889,061 B2

ARRANGEMENT FOR EVENING OUT POWDERY SOLID MATTER FEED OF A CONCENTRATE BURNER OF A SUSPENSION SMELTING OR SUSPENSION CONVERTING FURNACE

CROSS-REFERENCE TO RELATED APPLICATIONS

This is a national stage application filed under 35 USC 371 based on International Application No. PCT/FI2010/051008 filed Dec. 10, 2010, and claims priority under 35 USC 119 of Finnish Patent Application No. FI 20096313 filed Dec. 11, 2009.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

The object of the invention is an arrangement for feeding powdery solid matter into the concentrate burner of a suspension smelting or suspension converting furnace.

FIELD OF THE INVENTION

The invention relates to the feeding equipment of powdery solid matter of a concentrate burner of a suspension smelting furnace, such as a flash smelting furnace, by means of which the feed of powdery solid matter that is fed into the reaction shaft of the suspension smelting or suspension converting furnace can be evenly distributed already to the concentrate burner.

The feed of powdery solid matter, such as concentrate, slag forming agents and flue dust into the suspension smelting or suspension converting furnace is carried out through the concentrate burner that is placed on top of the reaction shaft of the suspension smelting or suspension converting furnace. Later on in the text, the term concentrate is used exclusively, referring to all of the powdery solid matter that is fed through the concentrate burner of the suspension smelting or suspension converting furnace. It is extremely important for the proper operation of the concentrate burner that the concentrate and process gases are evenly mixed, when discharging from the concentrate burner into the reaction space, i.e., the upper section of the reaction shaft of the suspension smelting or suspension converting furnace. If this is not the case, the result is on the one hand an area of under-reacted concentrate, where there is more concentrate than the targeted process gas/concentrate ratio and, on the other hand an area of over-reacted concentrate, where there is less concentrate than the targeted process gas/concentrate ratio. Poor mixing results in poor slag quality, for example.

Poor distribution of concentrate also has an obvious effect on the temperature profile of the reaction shaft; hot areas are generated in the suspension smelting furnace, where the autogenous lining that is formed by the concentrate, protecting the reaction shaft, is subjected to greater thermal stresses and the result may in the worst case lead to the destruction of the reaction shaft wall. It has also been indicated that dust formation is more marked when the concentrate burner does not function properly due to poor concentrate distribution.

The patent specification WO 00/73519 discloses equipment for evening out the feed of powdery solid matter of the concentrate burner of the suspension smelting or suspension converting furnace.

DESCRIPTION OF RELATED ART INCLUDING INFORMATION DISCLOSED UNDER 37 CFR 1.97 AND 1.98

Not Applicable.

BRIEF SUMMARY OF THE INVENTION

The object of the invention is to further improve the even feed of powdery solid matter.

The object of the invention is achieved by the arrangement for feeding powdery solid matter into a concentrate burner of a suspension smelting or suspension converting furnace.

Preferred embodiments of the arrangement according to the invention are described in the dependent claims.

The invention is based on the fact that the concentrate feed in the discharge pipe of the powdery solid matter is divided into four parts by means of a first partition and two second partitions, so that in the discharge pipe of the powdery solid matter four discharge pipe parts are formed for the concentrate, which preferably but not necessarily extend inside the annular concentrate discharge channel of the feeding means of the powdery solid matter of the concentrate burner. In a preferred embodiment, the first partition of the powdery solid matter discharge pipe is first adapted to divide the concentrate feed into two parts, the second partitions of the powdery solid matter discharge pipe thereafter being adapted so as to divide into two parts, so that the first partition and the second partitions divide the feed into four parts.

In a preferred embodiment, the first partition and the second partitions of the powdery solid matter discharge pipe extend inside the annular concentrate discharge channel of the concentrate burner up to the concentrate distributor in the middle of the annular concentrate discharge channel.

In a preferred embodiment, the annular concentrate discharge channel of the concentrate burner is provided with blades, which at least partially divide the annular concentrate discharge channel into sectors. In this preferred embodiment, the first partition of the powdery solid matter discharge pipe extends inside the annular concentrate discharge channel of the powdery solid matter feeding means up to the blade that divides the annular concentrate discharge channel into sectors, so that the blade and the first partition form an integral structure. In this preferred embodiment, each second partition of the powdery solid matter discharge pipe extends inside the annular concentrate discharge channel of the powdery solid matter feeding means up to the blade that divides the annular concentrate discharge channel into sectors, so that the blade and the second partition form an integral structure.

BRIEF DESCRIPTION OF THE SEVERAL VIEWS OF THE DRAWINGS

In the following, some preferred embodiments of the invention are described in detail with reference to the appended figures, wherein.

DETAILED DESCRIPTION OF THE INVENTION

Figure 1:
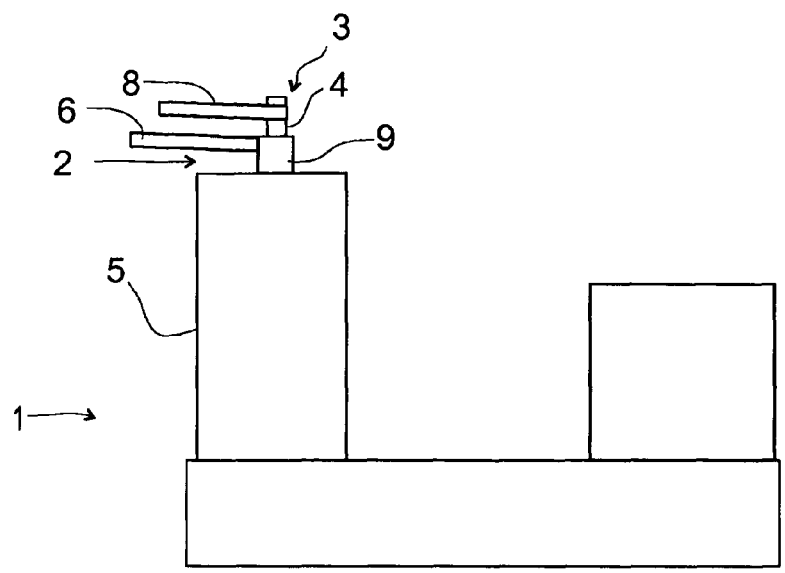
FIG. 1 shows a basic illustration of the suspension smelting or suspension converting furnace and its feeding equipment.

FIG. 1 shows an example of a suspension smelting or suspension converting furnace 1, into which powdery solid matter (not shown in the figures), such as concentrate, slag forming agent and/or flue dust are fed through a concentrate burner 2.

In FIG. 1, powdery solid matter is transferred to the upper section of the annular concentrate discharge channel 4 of the powdery solid matter feeding means 3 of the concentrate burner by means of the first powdery solid matter discharge pipe 8, so that a powdery solid matter falls down as a continuous flow through the above-mentioned annular concentrate discharge channel 4 to the upper section of the reaction shaft 5 of the suspension smelting or suspension converting furnace 1. In FIG. 1, reaction gas (not shown in the figures) is conveyed through reaction gas feeding means 6 from around an annular gas discharge channel 9 to the upper section of the reaction shaft 5 in the direction of the reaction shaft 5.

Figure 2:
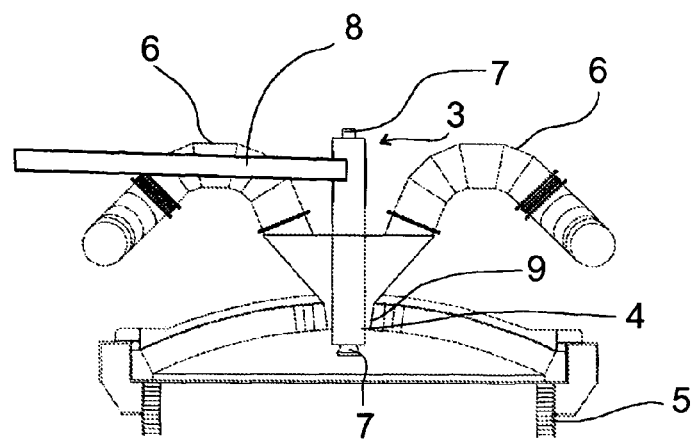
FIG. 2 is a vertical section of a first preferred embodiment of the feeding arrangement of the concentrate burner of the suspension smelting or suspension converting furnace.
Figure 3:
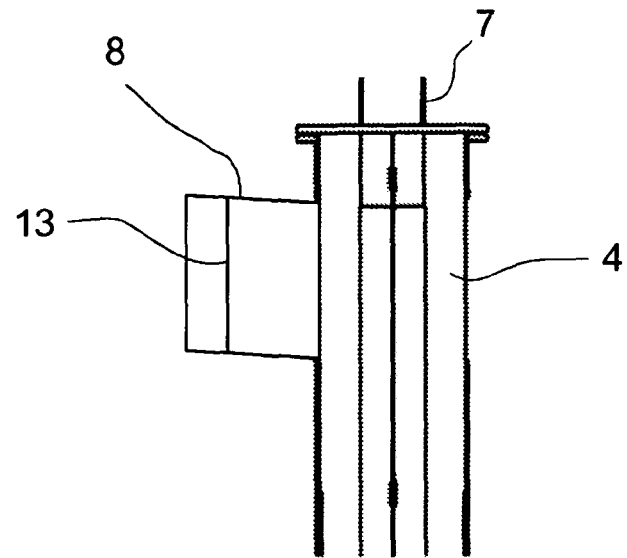
FIGS. 3 and 4 are a vertical section and a cross section of a structural arrangement of the powdery solid matter discharge pipe and the annular concentrate discharge channel of the powdery solid matter feeding means of the concentrate burner.

FIG. 2 shows in detail an apparatus for distributing powdery solid matter to the concentrate burner 2, where the feed of both powdery solid matter and reaction gas are carried out from one direction. Powdery solid matter is conveyed by means of the first powdery solid matter discharge pipe 8, preferably by an air slide conveyor, to the annular concentrate discharge channel 4 of the powdery solid matter feeding means 3. In the middle of the annular concentrate discharge channel 4, a concentrate distributor 7 is situated, the lower part of which being provided with holes (not marked with a reference number), through which dispersion gas that is fed horizontally (not shown) distributes concentrate flow outwards. The reaction gas feeding means 6 that are included in the concentrate burner 2 are connected to the annular gas discharge channel 9, which surrounds the annular concentrate discharge channel 4 and from which reaction gas is discharged to the upper section of the reaction shaft 5. The concentrate burner 2 thus comprises in its entirety the reaction gas feeding means 6, the powdery solid matter feeding means 3 and the concentrate distributor 7 that is situated in the middle.

Figure 5:
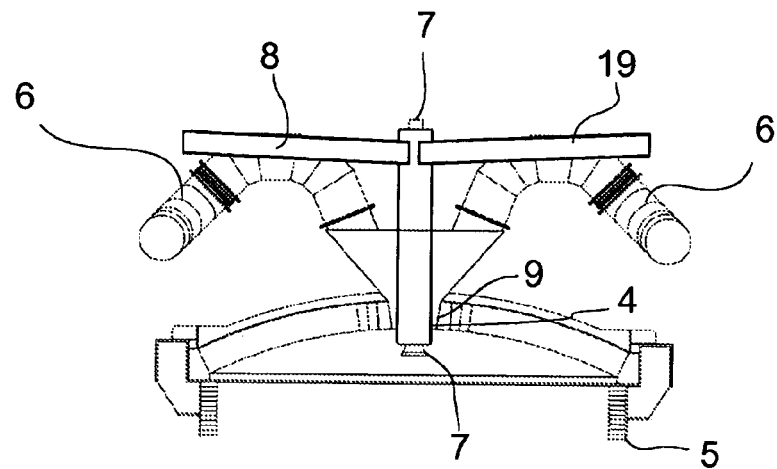
FIG. 5 is a vertical section of a second preferred embodiment of the feeding arrangement of the concentrate burner of the suspension smelting furnace.

FIG. 5 shows another apparatus for distributing powdery solid matter to the concentrate burner 2, where, deviating from FIG. 2, the feeds of both powdery solid matter and reaction gas are carried out from two directions: by means of two reaction gas feeding means 6 and the first powdery solid matter discharge pipe 8 and the second powdery solid matter discharge pipe 19.

The object of the invention is, first, an arrangement for feeding powdery solid matter into the concentrate burner 2 of the suspension smelting or suspension converting furnace 1, which burner can be used in the type of solution of FIG. 1, 2 or 5, for example.

The arrangement comprises the first powdery solid matter discharge pipe 8.

Alternatively, the arrangement can have both the first powdery solid matter discharge pipe 8 and the second powdery solid matter discharge pipe 19.

The concentrate burner comprises reaction gas feeding means 6, powdery solid matter feeding means 3 and the concentrate distributor 7.

The first powdery solid matter discharge pipe 8 and the possible second powdery solid matter discharge pipe 19 are provided with a first partition 10, which divides the powdery solid matter feed for dividing the first powdery solid matter discharge pipe 8 and the possible second powdery solid matter discharge pipe 19 into two essentially similar discharge pipe parts 11.

The powdery solid matter feeding means 3 of the concentrate burner 2 comprise an annular concentrate discharge channel 4 that surrounds the concentrate distributor 7 of the concentrate burner 2.

Figure 4:
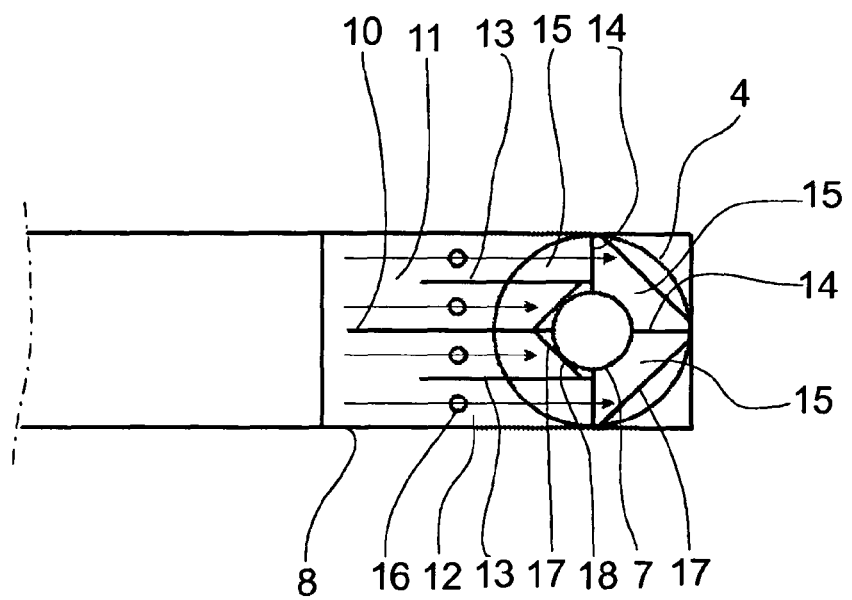
Figure 7:
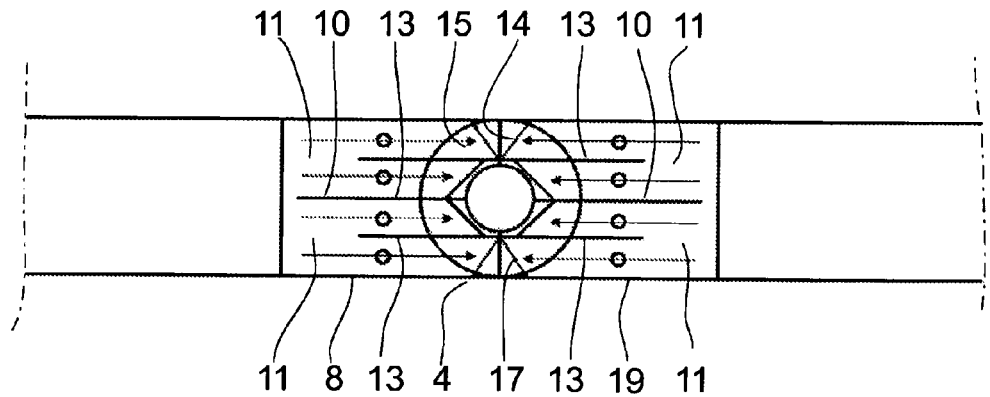

The first partition 10 of the first powdery solid matter discharge pipe 8 and the possible second powdery solid matter discharge pipe 19 extends preferably, but not necessarily, inside the annular concentrate discharge channel 4 of the powdery solid matter feeding means 3, as shown in FIGS. 4 and 7.

Each discharge pipe part 11 of the first powdery solid matter discharge pipe 8 and the possible second powdery solid matter discharge pipe 19 is at least partially divided into two discharge pipe portions 15 by a second partition 13, so that four discharge pipe portions 12 are formed in the first powdery solid matter discharge pipe 8 and the possible second powdery solid matter discharge pipe 19.

The second partitions 13 of the first powdery solid matter discharge pipe 8 and the possible second powdery solid matter discharge pipe 19 extend preferably, but not necessarily, inside the annular concentrate discharge channel 4 of the powdery solid matter feeding means 3, as shown in FIGS. 4 and 7.

In FIGS. 4 and 7, the first partition 10 extends inside the annular concentrate discharge channel 4 of the powdery solid matter feeding means 3 up to the concentrate distributor 7 or to the close proximity of the concentrate distributor 7 or nearly into contact with the concentrate distributor 7.

In FIGS. 4 and 7, the second partition 13 extends inside the annular concentrate discharge channel 4 of the powdery solid matter feeding means 3 up to the concentrate distributor 7 or to the close proximity of the concentrate distributor 7 or nearly into contact with the concentrate distributor 7.

Figure 8:
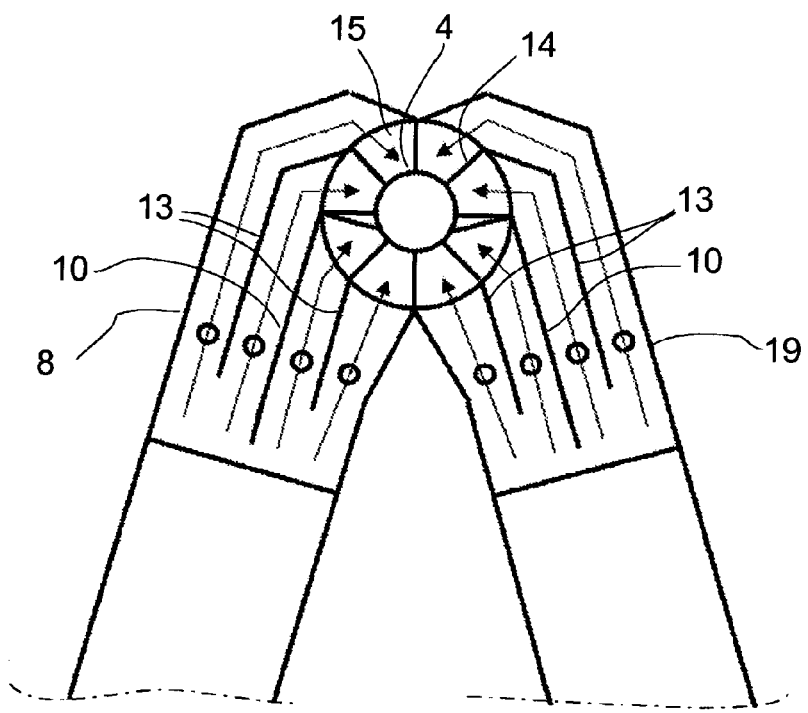
FIG. 8 shows an alternative implementation of the structural arrangement of two powdery solid matter discharge pipes and the annular concentrate discharge channel of the powdery solid matter feeding means of the concentrate burner shown in FIG. 7, and, FIGS. 9 and 10 are a cross section and a vertical cross section of a structural arrangement of the powdery solid matter discharge pipe and the annular concentrate discharge channel of powdery solid matter feeding means of the concentrate burner.

In FIGS. 4, 7 and 8, the annular concentrate discharge channel 4 of the powdery solid matter feeding means 3 is provided with blades 14, which divide the powdery solid matter feed and which at least partially divide the annular concentrate discharge channel 4 into sectors 15. In FIG. 4, each discharge pipe portion 12 of the first powdery solid matter discharge pipe 8 ends in a respective sector 18 of the annular concentrate discharge channel 4. In FIGS. 7 and 8, each discharge pipe portion 12 of the first powdery solid matter discharge pipe 8 and each discharge pipe portion 12 of the second first powdery solid matter discharge pipe 19 ends in a respective sector 15 of the annular concentrate discharge channel 4.

The first partition 10 of the first powdery solid matter discharge pipe 8 and the first partition 10 of the possible second powdery solid matter discharge pipe 19 extend preferably, but not necessarily, inside the annular concentrate discharge channel 4 of the powdery solid matter feeding means 3 up to the blade 14 that divides the annular concentrate discharge channel 4 into sectors 15, so that the blade 14 and the first partition 10 form an integral structure.

Each second partition 13 of the first powdery solid matter discharge pipe 8 and each second partition 13 of the possible second powdery solid matter discharge pipe 19 extend preferably, but not necessarily, inside the annular concentrate discharge channel 4 of the powdery solid matter feeding means 3 up to the blade that divides the annular concentrate discharge channel 4 into sectors 15, so that the blade 14 and at least one second partition 13 form an integral structure.

In FIG. 4, the first partition 10 of the first powdery solid matter discharge pipe 8 extends throughout the length of the first powdery solid matter discharge pipe 8 and the second partitions 13 of the first powdery solid matter discharge pipe 8 extend over a portion of the first powdery solid matter discharge pipe 8 only, in other words, not throughout the length of the first powdery solid matter discharge pipe 8.

In FIGS. 7 and 8, the first partition 10 of the first powdery solid matter discharge pipe 8 extends throughout the length of the first powdery solid matter discharge pipe 8 and the first partition 10 of the second powdery solid matter discharge pipe 17 extends throughout the length of the second powdery solid matter discharge pipe 19, but the second partitions 13 of the first powdery solid matter discharge pipe 8 and the second powdery solid matter discharge pipe 17 only extend over a portion of the first powdery solid matter discharge pipe 8 and only over a portion of the second powdery solid matter discharge pipe 19, respectively, in other words, not over the entire length of the first powdery solid matter discharge pipe 8 or the second powdery solid matter discharge pipe 17. For example, in the arrangement of FIG. 4, the first partition 13 of the first powdery solid matter discharge opening 8 is first adapted to divide the powdery solid matter feed into two parts, which the second partitions 13 of the first powdery solid matter discharge pipe 8 are thereafter adapted to divide into two parts, so that the first partition 10 and the second partitions 13 divide the powdery solid matter feed into four parts.

At least one discharge pipe portion 12 can be provided with a temperature sensor 16 for sensing a clogging in the discharge pipe portion 12 on the basis of the temperature of the discharge pipe portion 12. Sensing the clogging by the temperature sensor 16 may, for example, be based on the fact that the temperature of the clogged discharge pipe portion 12 decreases, because the temperature of the concentrate in it decreases.

At least one discharge pipe portion 12 can be provided with additional gas feeding means (not shown). For example, additional gas feeding means can be used for feeding pressurized gas, such as pressurized air into the discharge pipe portion 12, for example, for removing the observed clogging or, e.g., for feeding air into the discharge pipe portion 12 for creating a suspension of air and powdery solid matter.

At least one discharge pipe portion 12 comprises preferably, but not necessarily, an essentially vertical collision plate 17 next to the annular concentrate discharge channel 4 of the powdery solid matter feeding means 3, which essentially vertical collision plate 17 the powdery solid matter is adapted to collide with and which is thus adapted to reduce the speed of the powdery solid matter. The arrangement comprises preferably, but not necessarily, at least one vertical collision plate 17, which at least partly consists of blade 14 dividing the annular concentrate discharge channel 4 into sectors 15. The arrangement comprises preferably, but not necessarily, at least one vertical collision plate 17, the lower edge of which is designed 18 so as to distribute powdery solid matter evenly in the annular concentrate discharge channel 4.

The arrangement may comprise at least one discharge pipe portion 12 that is provided with a vertical collision plate 17 having an upper plate section 20 for reducing the velocity of powdery solid matter, wherein the upper plate section 20 is perpendicular to the discharge pipe portion 12, and having a lower plate section 21 for evenly distributing powdery solid matter in the annular concentrate discharge channel 4, wherein the lower plate section 21 is turned about a vertical line in relation to the upper plate section 20 so that the lower plate section 21 lies within a plane parallel with a plane tangential to the pipe 22 of the concentrate distributor 7 that is arranged inside the annular concentrate discharge channel 4.

Figure 9:
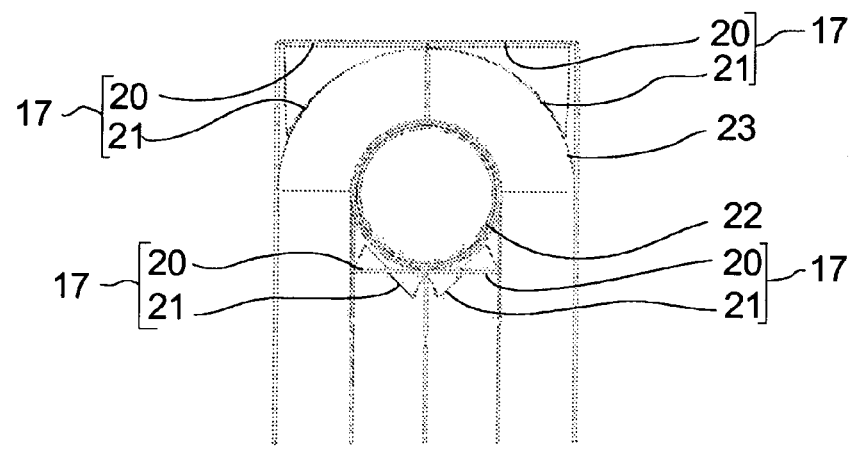
Figure 10:
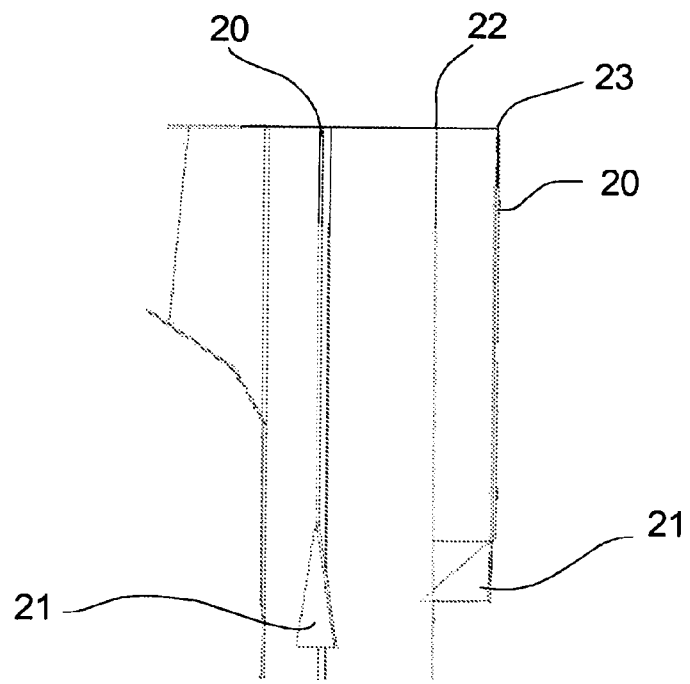

The arrangement may comprise at least one discharge pipe portion 12 that is provided with a vertical collision plate 17 having an upper plate section 20 that is perpendicular to the discharge pipe portion 12 and having a lower plate section 21 that is turned about a vertical line in relation to the upper plate section 20 so that the lower plate section 21 is tangential to the pipe 22 of the concentrate distributor 7 that is arranged inside the annular concentrate discharge channel 4. In FIG. 9 the two pipe portions 12 in the middle are provided with a vertical collision plate 17 of this kind.

The arrangement may comprise at least one discharge pipe portion 12 that is provided with a vertical collision plate 17 having an upper plate section 20 that is perpendicular to the discharge pipe portion 12 and having a lower plate section 23 that is turned and curved about a vertical line in relation to the upper plate section 20 so that the lower plate section 21 is co-centric with the pipe 23 surrounding the annular concentrate discharge channel 4. In FIG. 9 the two outermost pipe portions 12 are provided with a vertical collision plate 17 of this kind.

FIGS. 5-8 show an arrangement which in addition to the first powdery solid matter discharge pipe 8 comprises a second powdery solid matter discharge pipe 19 for feeding powdery solid matter into the powdery solid matter feeding means 3 of the concentrate burner 2. As shown in FIGS. 7 and 8, the second powdery solid matter discharge pipe 19 is also provided with a first partition 10 for dividing the second powdery solid matter discharge pipe into two essentially similar discharge pipe parts 11. The first partition 10 of the second powdery solid matter discharge pipe 19 can extend in a similar manner inside the annular concentrate discharge channel 4 of the powdery solid matter feeding means 3, and each discharge pipe part 11 of the second powdery solid matter discharge pipe 19 is at least partly divided into two discharge pipe portions 12 by a second partition 13, and the second partitions 13 can extend inside the annular concentrate discharge channel 4 of the powdery solid matter feeding means 3.

Figure 6:
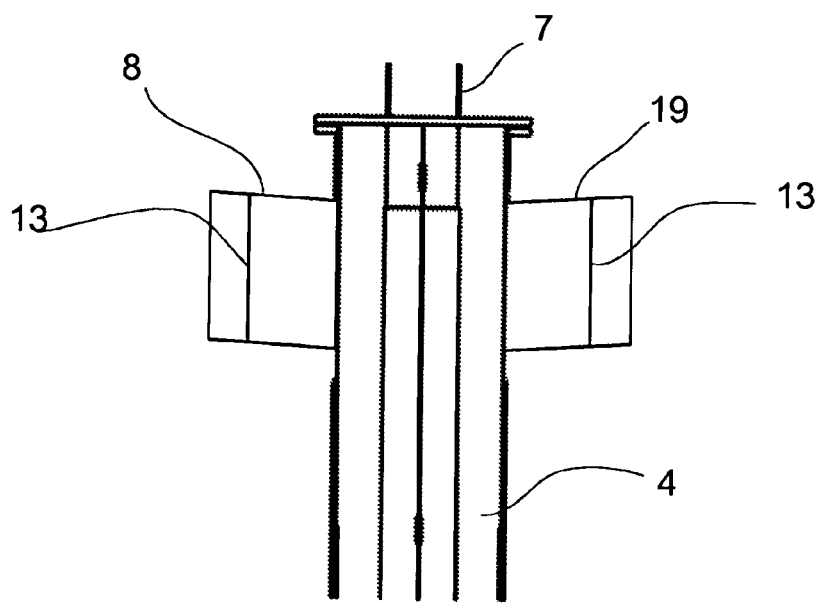
FIGS. 6 and 7 are a vertical section and a cross section of a structural arrangement of two powdery solid matter discharge pipes and the annular concentrate discharge channel of the powdery solid matter feeding means of the concentrate burner.

FIGS. 5 and 6 show an arrangement where the first powdery solid matter discharge pipe 8 and the second powdery solid matter discharge pipe 19 are connected at an essentially same height to the powdery solid matter feeding means 3 of the concentrate burner 2. However, it is also possible that the first powdery solid matter discharge pipe 8 and the second powdery solid matter discharge pipe 19 are connected at different heights to the powdery solid matter feeding means 3 of the concentrate burner 2.

FIG. 7 shows an arrangement where the first powdery solid matter discharge pipe 8 and the second powdery solid matter discharge pipe 19 are connected diametrally to the powdery solid matter feeding means 3.

FIG. 8 shows an arrangement where the first powdery solid matter discharge pipe 8 is adapted at an angle with respect to the second powdery solid matter discharge pipe 19.

It is obvious to those skilled in the art that with technology improving, the basic idea of the invention can be implemented in various ways. Thus, the invention and its embodiments are not limited to the examples described above but they may vary within the claims.

SEQUENCE LISTING

Not Applicable.

The invention claimed is:

1. An arrangement for feeding powdery solid matter into a concentrate burner of a suspension smelting or suspension converting furnace,
whereby the concentrate burner comprises reaction gas feeding means, powdery solid matter feeding means and a concentrate distributor;
the arrangement comprising a first powdery solid matter discharge pipe for feeding powdery solid matter into the powdery solid matter feeding means of the concentrate burner;
whereby the first powdery solid matter discharge pipe is provided with a first partition, which divides the solid matter, for dividing the first powdery solid matter discharge pipe into two essentially similar discharge pipe parts; and
whereby the powdery solid matter feeding means of the concentrate burner comprise an annular concentrate discharge channel that surrounds the concentrate distributor of the concentrate burner,
wherein
each discharge pipe part of the first powdery solid matter discharge pipe is at least partly divided into two discharge pipe portions by a second partition, and
at least one discharge pipe portion comprises an essentially vertical collision plate next to the annular concentrate discharge channel of the powdery solid matter feeding means, powdery solid matter being adapted so as to collide with the essentially vertical collision plate and the essentially vertical collision plate being adapted so as to reduce the speed of powdery solid matter,
the vertical collision plate has an upper plate section for reducing the velocity of powdery solid matter, wherein the upper plate section is perpendicular to the discharge pipe portion, and
the vertical collision plate has a lower plate section for evenly distributing powdery solid matter in the annular concentrate discharge channel, wherein the lower plate section is turned about a vertical line in relation to the upper plate section so that the lower plate section lies within a plane parallel with a plane tangential to the pipe of the concentrate distributor that is arranged inside the annular concentrate discharge channel.

2. An arrangement according to claim 1, wherein the first partition extends into the annular concentrate discharge channel of the powdery solid matter feeding means.

3. An arrangement according to claim 2, wherein the first partition extends into the annular concentrate discharge channel of the powdery solid matter feeding means up to the concentrate distributor.

4. An arrangement according to claim 1, wherein the second partitions extend into the annular concentrate discharge channel of the powdery solid matter feeding means.

5. An arrangement according to claim 4, wherein the second partitions extend into the annular concentrate discharge channel of the powdery solid matter feeding means up to the concentrate distributor.

6. An arrangement according to claim 1, wherein the annular concentrate discharge channel of the powdery solid matter feeding means is provided with blades, which divide solid matter and which at least partly divide the annular concentrate channel into sectors.

7. An arrangement according to claim 6, wherein the first partition extends into the annular concentrate discharge channel of the powdery solid matter feeding means and up to the blade, which divides the annular concentrate discharge channel into sectors, so that the blade and the first partition form an integral structure.

8. An arrangement according to claim 6, wherein each second partition extends into the annular concentrate discharge channel of the powdery solid matter feeding means and up to the blade, which divides the annular concentrate discharge channel into sectors, so that the blade and each one of the first partitions form an integral structure.

9. An arrangement according to claim 6, wherein each discharge pipe portion ends in a respective sector of the annular concentrate discharge channel.

10. An arrangement according to claim 1, wherein the second partitions extend over a portion of the first powdery solid matter discharge pipe only.

11. An arrangement according to claim 1, wherein said at least one vertical collision plate is formed of the blade that divides the annular concentrate discharge channel into sectors.

12. An arrangement according to claim 1, wherein said at least one vertical collision plate has a lower edge formed so as to divide the powdery solid matter evenly in the annular concentrate discharge channel.

13. An arrangement according to claim 1, wherein said vertical collision plate has a lower plate section that is turned and curved about a vertical line in relation to the upper plate section so that the lower plate section is concentric with the pipe surrounding the annular concentrate discharge channel.

14. An arrangement according to claim 1, wherein said at least one discharge pipe portion is provided with a temperature sensor (16) for sensing a clogging in the discharge pipe portion.

15. An arrangement according to claim 1, wherein said at least one discharge pipe portion is provided with additional gas feeding means.

16. An arrangement according to claim 1,
comprising additionally a second powdery solid matter discharge pipe for feeding powdery solid matter into the powdery solid matter feeding means of the concentrate burner;
wherein the second powdery solid matter discharge pipe is provided with a first partition, which divides solid matter, for dividing the second powdery solid matter discharge pipe into two essentially similar discharge pipe parts; and
each discharge pipe part of the second powdery solid matter discharge pipe is at least partly divided into two discharge pipe portions by a second partition.

17. An arrangement according to claim 16, wherein the first partition of the second powdery solid matter discharge pipe extends inside the annular concentrate discharge channel of the powdery solid matter feeding means.

18. An arrangement according to claim 16, wherein the second partition extends inside the annular concentrate discharge channel of the powdery solid matter feeding means.

19. An arrangement according to claim 16, wherein the first powdery solid matter discharge pipe and the second powdery solid matter discharge pipe are connected at an essentially same height to the powdery solid matter feeding means of the concentrate burner.

20. An arrangement according to claim 16, wherein the first powdery solid matter discharge pipe and the second powdery solid matter discharge pipe are connected at different heights to the powdery solid matter feeding means of the concentrate burner.

21. An arrangement according to claim 16, wherein the first powdery solid matter discharge pipe is adapted at an angle with respect to the second powdery solid matter discharge pipe.

22. An arrangement according to claim 16, wherein the first powdery solid matter discharge pipe and the second powdery solid matter discharge pipe are connected diametrally to the powdery solid matter feeding means.

* * * * *